(12) United States Patent
Zajac et al.

(10) Patent No.: US 11,488,404 B2
(45) Date of Patent: Nov. 1, 2022

(54) SESSION UNIQUE ACCESS TOKEN FOR COMMUNICATIONS WITH A VEHICLE

(71) Applicant: Ford Global Technologies, LLC, Dearborn, MI (US)

(72) Inventors: Daniel Aaron Zajac, Carleton, MI (US); Aldi Caushi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 476 days.

(21) Appl. No.: 16/601,076

(22) Filed: Oct. 14, 2019

(65) Prior Publication Data
US 2021/0110148 A1    Apr. 15, 2021

(51) Int. Cl.
| | |
|---|---|
| G06V 30/40 | (2022.01) |
| G07C 5/00 | (2006.01) |
| H04L 9/32 | (2006.01) |
| H04L 67/12 | (2022.01) |
| H04N 1/32 | (2006.01) |
| G07C 5/08 | (2006.01) |

(52) U.S. Cl.
CPC ............ *G06V 30/40* (2022.01); *G07C 5/008* (2013.01); *G07C 5/0808* (2013.01); *H04L 9/3247* (2013.01); *H04L 67/12* (2013.01); *H04N 1/32128* (2013.01)

(58) Field of Classification Search
CPC ..... G07C 5/008; G07C 5/0808; H04L 9/3247; H04L 67/12

USPC .......................................................... 726/6
See application file for complete search history.

(56) References Cited

U.S. PATENT DOCUMENTS

| | | | |
|---|---|---|---|
| 2014/0067195 A1* | 3/2014 | James | G06Q 10/06 701/32.4 |
| 2015/0094903 A1 | 4/2015 | Bell | |
| 2017/0310674 A1* | 10/2017 | Markham | H04L 63/0435 |
| 2018/0013569 A1* | 1/2018 | Knopf | H04L 9/0891 |
| 2019/0250616 A1* | 8/2019 | Ramanujam | G07C 5/085 |

FOREIGN PATENT DOCUMENTS

| | | |
|---|---|---|
| CN | 102098326 A | 6/2011 |
| CN | 108207039 A | 6/2018 |
| WO | 2016128648 A1 | 8/2016 |

* cited by examiner

*Primary Examiner* — Bryan F Wright
(74) *Attorney, Agent, or Firm* — Brandon Hicks; Bejin Bieneman PLC

(57) ABSTRACT

A system includes a first computer including a processor programmed to receive, from a remote device, a first digital document including a digital signature from a server and specifying access to one or more vehicle systems for a user. The processor is further programmed to receive, from the server, a second digital document authorizing the specified access to the one or more vehicle systems; and provide, to the remote device, the specified access to the one or more vehicle systems based on the first digital document and second digital document.

20 Claims, 3 Drawing Sheets

SESSION UNIQUE ACCESS TOKEN FOR COMMUNICATIONS WITH A VEHICLE

BACKGROUND

Security protocols are typically applied to various vehicle systems to provide access to diagnostic, development and security related functions. Respective systems can require separate authentication procedures, e.g., employing a separate security token generated by a separate server.

DETAILED DESCRIPTION

Figure 1:
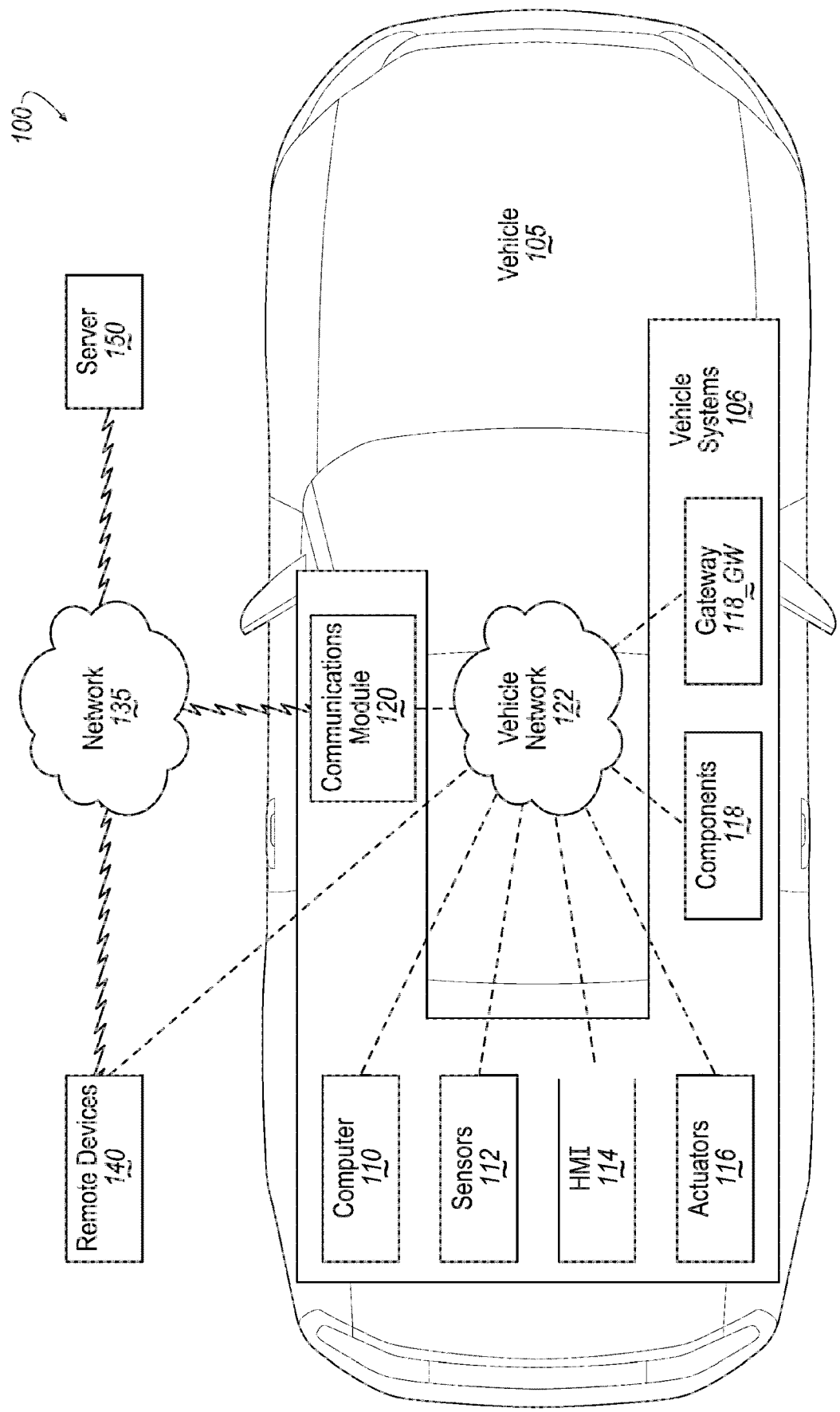
FIG. 1 is a block diagram illustrating an example system for providing session access to a plurality of vehicle systems.

A system includes a first computer including a first processor and a first memory, the first memory including instructions such that the first processor is programmed to receive, from a remote device, a first digital document including a digital signature from a server and specifying access to one or more vehicle systems for a user. The processor is further programmed to receive, from the server, a second digital document authorizing the specified access to the one or more vehicle systems; and provide, to the remote device, the specified access for the user to the one or more vehicle systems based on the first digital document and second digital document.

In other features, the second digital document includes one or more third digital documents, the one or more third digital documents authorizing the specified access to vehicle systems of the one or more vehicle systems.

In other features, the first processor can further be programmed to install each of the one or more third digital documents in a respective vehicle system for which the respective third digital document authorizes the specified access.

In other features, the second digital document can include a script to install at least one of the one or more third digital documents in the respective vehicle system; and the first processor can further be programmed to execute the script.

In other features, the specified access to the one or more vehicle systems can be based on a user identifier.

In other features, the second digital document can be encrypted based on a server private key; and the first processor can be further programmed to decrypt the second digital document based on a server public key.

In other features, the first processor can be further programmed to transmit a request to the server prior to receiving the second digital document from the server, the request including identifiers for the one or more vehicle systems and data from the first digital document.

In other features, the first processor can be further programmed to authenticate the second digital document based in part on the second digital document including data from the request to the server.

In other features, the server can include a second processor and a second memory, the second memory including instructions such that the second processor can be programmed to receive a message from the remote device, requesting access to the one or more vehicle systems. The second processor can be further programmed to generate the first digital document specifying the access to the one or more vehicle systems for the remote device and including the digital signature from the server; and transmit the first digital document to the remote device.

In other features, the second processor can be further programmed to specify the access to the one or more vehicle systems based on at least one of a user identifier and a remote device identifier included in the message.

In other features, the second processor can be further programmed to generate the first digital document based on determining that a user identifier in the message is included in a list of authorized user identifiers.

In other features, the second processor can be further programmed to generate the first digital document based on determining that a remote device identifier in the message is included in a list of authorized remote devices.

In other features, the second processor can be further programmed to, upon receiving the message from the first processor, confirm that the message includes the first digital document; and based on the confirmation, generate the second digital document.

In other features, the second processor can be further programmed to generate a challenge response to a challenge number from one of the one or more vehicle systems in the message; and include the challenge response in the second digital document.

Further disclosed is a method including receiving from a remote device, a first digital document including a digital signature from a server and specifying access to one or more vehicle systems for the remote device. The method further includes receiving from the server, a second digital document authorizing the specified access to the one or more vehicle systems; and providing, to the remote device, the specified access to the one or more vehicle systems based on the first digital document and second digital document.

In other features, the second digital document can include one or more third digital documents, the one or more third digital documents authorizing the specified access to vehicle systems of the one or more vehicle systems.

In other features, the method can include installing each of the one or more third digital documents in a respective vehicle system for which the respective third digital document authorizes the specified access.

In other features, the second digital document can include a script to install at least one of the one or more third digital documents in the respective vehicle system, and the method can further include executing the script.

In other features, the specified access to the one or more vehicle systems can be based on a user identifier.

In other features, the second digital document can be encrypted based on a server private key, and the method can further include decrypting the second digital document based on a server public key.

Further disclosed herein is a computing device programmed to execute any of the above method steps.

Yet further disclosed herein is a computer program product, including a computer readable medium storing instructions executable by a computer processor, to execute any of the above method steps.

FIG. 1 is a block diagram of an example system 100 for providing session access for a remote device 140 to a plurality of vehicle systems 106 in a vehicle 105. The system 100 includes the vehicle 105, one or more remote devices 140 and a server 150 communicatively coupled by a network 135. For ease of illustration, the system 100 is described below as including one vehicle 105. The system 100, and the session access granted by the system 100, may, however, include one or more vehicles 105.

A user can send a message, via a remote device 140, requesting a session access token from the server 150. A session access token is a digital document specifying access to one or more vehicle systems 106 for the remote device 140 and including a digital signature from the server 150. The access for the remote device 140 may be based on a user identifier included in the digital document. The message identifies vehicle systems 106 in the vehicle 105 for which access is requested during the session. The term "vehicle system 106," as used herein, means a vehicle electronic/electromechanical system, subsystem, component 118, actuator 116, sensor 112, interface, module, etc. that performs a function in the vehicle 105 and includes a processor programmed for transmitting and/or receiving messages via a vehicle communications network 122. The term "token" as used herein is a digital document including authorization to engage in one or more specified activities. The term "access to a vehicle system 106" as used herein means authorized communication with the vehicle system 106. Access to the vehicle system 106 may be full or limited. Full access means that the user, via the remote device 140, is authorized to receive all data transmitted by the vehicle system 106 and may send messages, e.g., commands, controlling all features of the vehicle system 106. Limited access limits the user to control some features of the vehicle system 106 and not control other features of the vehicle system 106, or to control certain features only within specified limits.

The server 150 can receive the requests and generate the session access token. The session access token specifies vehicle systems 106 to which the remote device 140 has access, and a level of access for each vehicle system 106. The session access token can further specify remote devices 140 with which the user may access each of the vehicle systems 106. The server 150 can send the session access token to the remote device 140.

The remote device 140, typically upon receiving user input to request a session, can send the session access token to a gateway component 118_GW on the vehicle 105. For ease of discussion, requests for session access for a vehicle 105 will be described herein as received, processed and distributed by a gateway 118_GW in the vehicle 105. One or more other vehicle systems 106 such as, for example, another component 118, may alternatively or additionally be programmed to perform these functions.

The gateway 118_GW, as described below, can negotiate with the server 150 and vehicle systems 106 to establish the authorized access to the vehicle systems 106 for a session. A "session" in the present context means a time period during which the user, via the remote device 140, may access the vehicle systems 106. The time period may be specified as fixed amount of time (for example, four hours), as a beginning time and an end time, or, for example, until an event occurs, such as the user terminating the session or the server 150 terminating the session.

Each vehicle 105 includes a vehicle computer 110, sensors 112, a human-machine interface (HMI) 114, actuators 116, the vehicle components 118, and a vehicle communications module 120 communicatively coupled by a vehicle communications network 122. Vehicle components 118 include a gateway component 118_GW.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via the vehicle communications network 122, more than one processor, e.g., included in electronic controller units (ECUs) or the like included in the vehicle 105 for monitoring and/or controlling various vehicle components 118, e.g., a transmission controller, a brake controller, a steering controller, etc. The vehicle computer 110 is generally arranged for communications on the vehicle communication network 122 that can include one or more busses in the vehicle 105 such as a controller area network (CAN) or the like, and/or other wired and/or wireless mechanisms.

Via the vehicle communications network 122, the vehicle computer 110 may transmit messages to various devices in the vehicle 105 and/or receive messages (e.g., CAN messages) from the various devices, e.g., sensors 112, the human machine interface (HMI) 114, an actuator 116, the vehicle components 118, etc. Alternatively, or additionally, in cases where the vehicle computer 110 actually comprises a plurality of devices, the vehicle communications network 122 may be used for communications between devices represented as the vehicle computer 110 in this disclosure. Further, as mentioned below, various controllers and/or sensors 112 may provide data to the vehicle computer 110 via the vehicle communications network 122.

In addition, the vehicle computer 110 may be configured for communicating via the vehicle communication module 120 with devices outside of the vehicle 105, e.g., through a vehicle-to-vehicle (V2V) or vehicle-to-infrastructure (V2X) wireless communications to another vehicle 105 or via the network 135 with computing devices such as the remote devices 140 and the server 150.

The sensors 112 may include a variety of devices such as are known to provide data to the vehicle computer 110. For example, the sensors 112 may include Light Detection And Ranging (LIDAR) sensor(s) 112, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 112 fixed to vehicle 105 bumpers may provide data to provide locations of the objects, second vehicles 105, etc., relative to the location of the vehicle 105. The sensors 112 may further, alternatively or additionally, include camera sensor(s) 112 and/or other image sensors 112, e.g. front view, side view, etc., providing images from an area surrounding the vehicle 105.

The sensors 112 may further include temperature sensors 112, pressure sensors 112, rotation sensors 112, angle sensors 112, position sensors 112, torque sensors 112, etc. to detect vehicle operating states such as vehicle cabin temperature, vehicle engine temperature, vehicle speed, vehicle acceleration, vehicle turning angle, engine speed, brake pressure, etc. The sensors 112 may be stand-alone units, including processors and being programmed for communications on the vehicle communications network 122. Alternatively, the sensors 112 may be included in respective vehicle systems 106, and communicatively coupled to processors included in those vehicle systems 106.

The vehicle 105 further includes a human-machine interface (HMI) 114. The human-machine interface (HMI) 114 includes input devices such as knobs, buttons, switches, pedals, levers, touch screens, microphones, etc. that can receive input from a user. For example, the HMI 114 may include a brake pedal, an accelerator pedal, and a steering wheel for receiving inputs from a user for controlling the vehicle 105. The input devices may include sensors 112 to detect user inputs and provide user input data to the vehicle computer 110. For example, the steering wheel may include sensors 112 to detect an angle of rotation of the steering wheel and provide the data to the vehicle computer 110.

The HMI 114 further includes output devices such as displays (including touch screen displays), speakers, lights, etc. that output signals or data to the user. The HMI 114 is coupled to the vehicle communications network 122 and can send and/or receive messages to/from the vehicle computer 110 and other vehicle systems 106.

The actuators 116 are implemented via circuits, chips, or other electronic and or mechanical components that can actuate various vehicle subsystems in accordance with appropriate control signals as is known. The actuators 116 may be used to control vehicle components 118, including braking, acceleration, and steering of a vehicle 105.

A vehicle component 118 in the context of this disclosure is one or more hardware assemblies, including an electronic control unit (ECU) including one or more processors and memory including instructions for programming the processors, adapted to perform a mechanical or electro-mechanical function or operation—such as moving the vehicle 105, slowing or stopping the vehicle 105, steering the vehicle 105, etc. Non-limiting examples of vehicle components 118 include a propulsion component 118 (that includes, e.g., an internal combustion engine and/or an electric motor, etc.), a transmission component 118, a steering component 118 (e.g., that may include one or more of a steering wheel, a steering rack, etc.), a brake component 118, a park assist component 118, an adaptive cruise control component 118, an adaptive steering component 118, a movable seat 118, a gateway 118_GW, etc.

The vehicle components 118 include the gateway 118_GW. The gateway 118_GW, as used herein, is an electronic control module that routes communications traffic within the vehicle 105. The gateway 118_GW is programmed to communicate, via the vehicle communications module 120 with the remote devices 140 and the server 150. The gateway 118_GW is further programmed to communicate, via the vehicle network 122, with vehicle systems 106 such as the vehicle computer 110, sensors 112, HMI 114, actuators 116, vehicle components 118, etc.

The gateway 118_GW may, for example, receive a session access token from a remote device 140, and transmit the session access token the server 150. The gateway 118_GW may further receive from the server 150 access tokens for one or more vehicle systems 106 and instructions for installing the access tokens in respective vehicle systems 106. Based on the instructions, the gateway 118_GW may further install the access tokens in the respective vehicle systems 106 such that a user, via the remote device 140, can access the respective vehicle systems 106.

The gateway 118_GW may further manage expiration/revocation of session access. For example, the gateway 118_GW may determine that the user's request has expired and execute a script to close the connection. Prior to closing the connection, the gateway 118_GW may further check to see if communications are on-going between the requestor the vehicle system 106. In case that the communications are on-going, the gateway 118_GW may, for example, send a notice to the requestor that access has expired.

The vehicle communications module 120 includes one or more mechanisms by which the vehicle systems 106 such as the vehicle computer 110, the vehicle gateway 118_GW, etc. may communicate with computing devices external to the vehicle 105 such as the remote devices 140, the server 150, other vehicles 105, traffic infrastructure devices, etc. The vehicle communications module 120 includes any desired combination of wireless (e.g., cellular, wireless, satellite, microwave and radio frequency) communication mechanisms and any desired network topology (or topologies when a plurality of communication mechanisms are utilized). Exemplary communications provided via the vehicle communications module 120 include cellular, Bluetooth, IEEE 802.11, dedicated short range communications (DSRC), and/or wide area networks (WAN), including the Internet, providing data communication services.

The vehicle communications network 122, as used herein, is defined as one or more mechanisms for wired or wireless communications between vehicle systems 106 of the vehicle 105. The vehicle communications network 122 can include, for example, one or more vehicle communications busses and one or more wireless communications networks. Non-limiting examples of vehicle communications busses include Controller Area Network (CAN) busses, Local Interconnect Network (LIN) busses, and Ethernet networks. Non-limiting examples of wireless communications networks include Bluetooth, Bluetooth Low Energy (BLE), and Wi-Fi Direct.

The network 135 represents one or more mechanisms by which the vehicle computer 110, the gateway 118_GW, and other vehicle systems 106 may communicate with remote devices such as the remote devices 140 and the server 150. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

A remote device 140 is a computing device including a processor and a memory such as are known. A remote device 140 is programmed for communications with vehicle systems 106 via the vehicle communications network 122 and may include a human machine interface to support development, testing or diagnosis of vehicle systems 106 by the user. A remote device 140 may include programming, digital keys, etc., to establish or confirm trustworthiness with the server 150. Trustworthiness means, in this context, that the remote device 140 can establish a level of trust such that the server 150 is authorized to provide the session access token to the remote device 140. For example, the remote device 140 may include a digital key that matches or is paired with a digital key on the server 150 such that the remote device 140 and the server 150 can exchange encrypted communications. As another example, the remote device 140 may have an identifier that is listed as an authorized device on the server 150.

Based on receipt of the session access token, the remote device 140 is further programmed to request access to vehicle systems 106, such as one of the components 118. The remote device 140 may transfer the request to the gateway 118_GW which manages the access to vehicle systems 106 as described herein.

In an example, a user could download an application to the remote device 140 from the server 150. The application may, during a time period specified by the session access token, establish, in cooperation with the gateway 118_GW, access to vehicle systems 106 identified in the session access token.

The server 150 can be a conventional computing device, i.e., including one or more processors and one or more memories, programmed to provide operations such as disclosed herein. Further, the server 150 can be accessed via the network 135, e.g., the Internet or some other wide area network.

The server 150 is programmed to receive requests from the remote device 140 for access to one or more vehicle systems 106 in the vehicle 105, determine a level of access for the remote device 140, and provide a session access token to the remote device 140 specifying access levels to one or more vehicle systems 106 for the remote device 140. The specified access may be for a specified user (user with a specified identifier), for a specified remote device 140, or for a specified user via a specified remote device 140. The server 150 may further be programmed to sign the session access token with a server 150 specific digital signature. In some cases, the user may receive the session access token via a first remote device 140 and use the session access token via a second remote device 140. In this case, for example, the user may transfer session access token from the first remote device 140 to the second remote device 140 prior to utilizing the session token.

The server 150 is further programmed to receive requests from the gateway 118_GW of the vehicle 105 to authenticate session access tokens, and provide to the gateway 118_GW, the necessary tokens, scripts and procedures to provide access of the remote device 140 to the vehicle systems 106. A script in the present context is a set of instructions, executable by a processor, typically after being interpreted by an interpreter as is known.

The server 150 may include, i.e., maintain in a nonvolatile memory, public keys for a plurality of vehicles 105 (or, for example, gateways 118_GW for the respective vehicles) to provide secure communication with the vehicles 105. The server 150 may further maintain, in the memory, a server 150 private key, which the server 150 may utilize for digitally signing the session access token and other digital documents.

The server 150 may further include in memory, security data related to the one or more vehicle systems 106. The term "security data" in the present context means data, algorithms, scripts, etc., that the server 150 can utilize to determine and provide access to the vehicle systems 106. For example, the security data may include security tokens, or programming to generate security tokens for the vehicle systems 106. The security data may further include criteria for granting access to the vehicle systems 106. For example, the security data may include, for each vehicle system, a list of authorized users and/or authorized remote devices 140. As another example, the security data may include mechanisms for receiving and responding to challenge numbers from vehicle systems 106 for which access is requested.

Figure 2A:
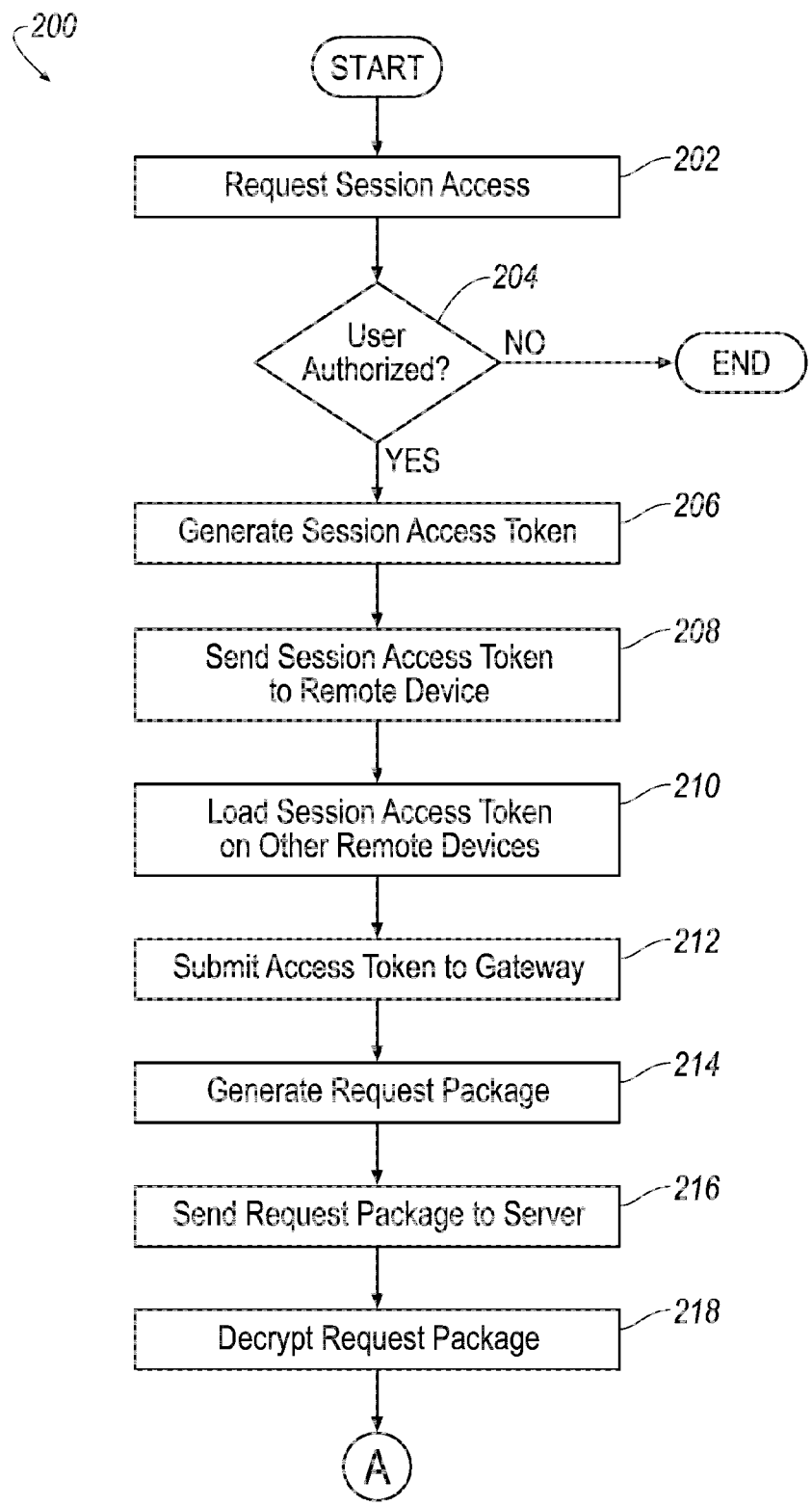
FIGS. 2A and 2B are a flow diagram of an example process for providing session access to a plurality of vehicle systems.
Figure 2B:
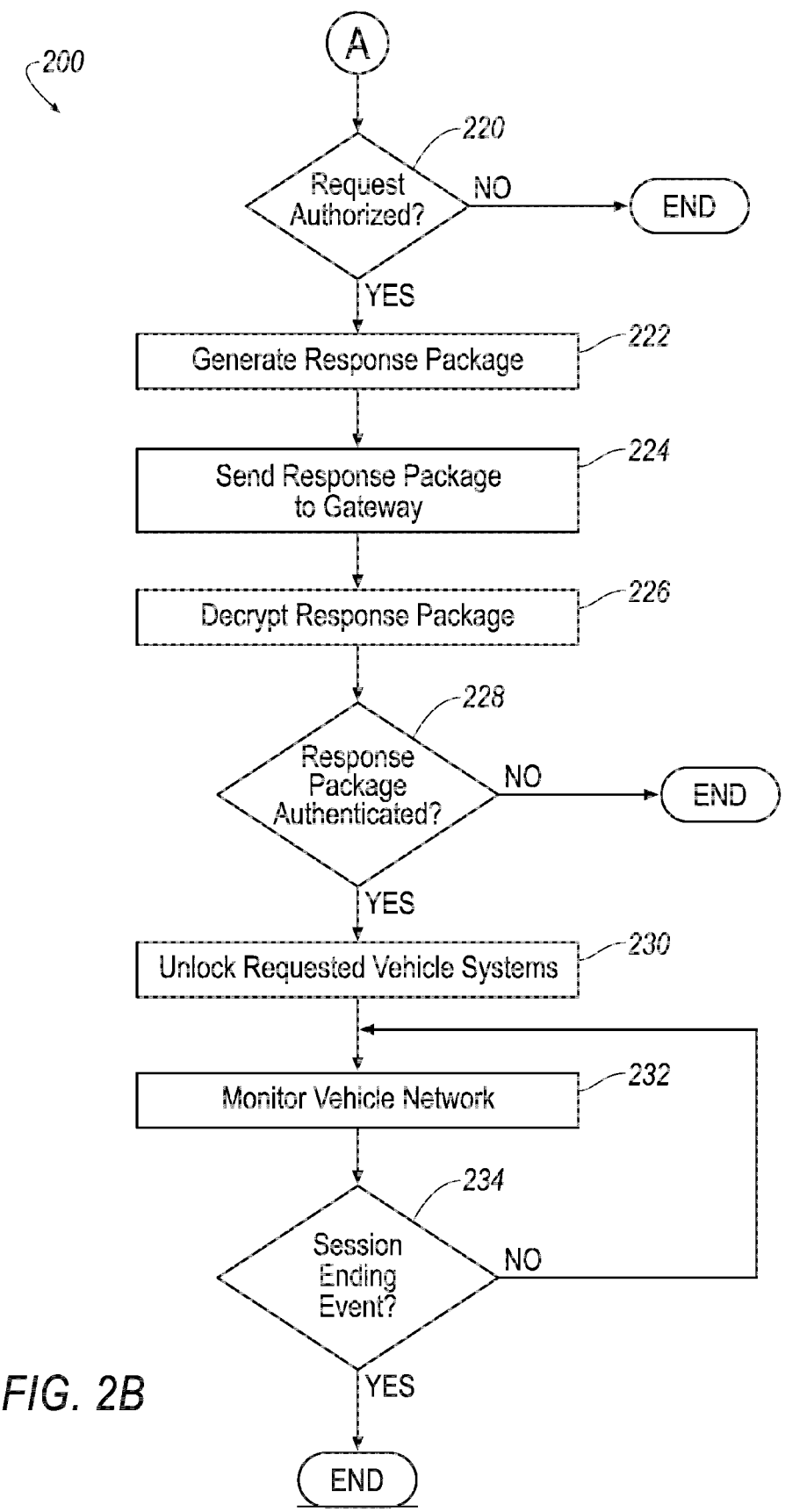

FIGS. 2A and 2B are a flow diagram of an example process 200 for providing session access to a plurality of vehicle systems 106 to a remote device 140. The process 200 begins in a block 202.

In the block 202, a remote device 140, sends a message to a server 150 requesting session access to one or more vehicle systems 106 in a vehicle 105. The message may include:
1) a time frame for a requested session,
2) an identifier of the vehicle 105 to which the user requests access,
3) identifiers for one or more vehicle systems 106 to which the access is requested,
4) a level of access requested respectively for each vehicle system 106,
5) an identifier of the user for whom access is requested, and
6) an identifier of remote devices 140 for which access is requested.

A time frame as used herein is a description of a time period, such as a date, beginning and ending times-of-day, a number of ignition cycles, a number of uses of the session access token, a number of transactions, etc. An "identifier" is a substantially unique set of data, typically an alphanumeric string of data, corresponding to a specific user, remote device 140, vehicle 105, vehicle system 106, etc. For example, the identifier for the vehicle 105 may be the vehicle identification number (VIN). The user identifier may be, for example, an alphanumeric string of data corresponding to a specific user or group of users. The identifier of a vehicle system 106 may be, for example, a serial number of a module in the vehicle system 106, an identifier of a processor conducting communications for the vehicle system 106, etc. The process continues in a block 204.

In the block 204, the server 150 determines whether the user is authorized. For example, the server 150 may maintain a list of user identifiers of authorized users. The server 150 may determine whether the user identifier provided in the request is included in the list of authorized users. As another example, the server 150 may request, and receive, from a third party, authorization for the user. In an example, the third party could purchase credits that can be used by the server 150 to provide session access to the user.

In case that the server 150 determines the user is authorized, the process 200 continues in a block 206. Otherwise, the user is not authorized, whereupon the process 200 ends. Prior to ending the process 200, the server 150 may send a message, for example, to the remote device 140, indicating that the requested access has been denied.

In the block 206, in the case that the user is authorized, and based on the identity of the user, the server 150 generates a session access token. The session access token includes one or more of:
1) the time period for the session,
2) the identifier for the vehicle 105 for which access is authorized, 3) the identifiers for the one of more vehicle systems 106 for which access is authorized,
4) the identifier of a user for which access is granted;
5) the identifier of one or more remote devices 140 for which access is granted;
6) the level of user access respectively for each of the one or more vehicle systems 106, and
7) a digital signature from the server 150.

For example, as described above, the server 150 may maintain a table of users including approved accesses for the user. The table may include the user identifiers and may identify systems and levels of access that the server 150 may authorize for each user. Table 1 is an example, partial User Approved Access Table.

TABLE 1

User Approved Access Table

| User | User Identifier | Vehicle System 1 | Vehicle System 2 | Vehicle System n |
|---|---|---|---|---|
| 1 | alphanumeric string #1 | Full read/write | Read only | Read/limited write |
| 2 | alphanumeric string #2 | Read only | Read only | none |
| n | alphanumeric string n | Full read/write | Full read/write | Full read/write |

In some cases, the server 150 may further specify remote devices 140 which the user may utilize to access the vehicles systems 106. For example, the server 150 may maintain a list authorized remote device identifiers, and For example, the server 150 may generate the session access token to include all the access requested by the user, unless the user's approved access is restricted based on the User Approved Access Table. The server 150, in this case, may generate the session access token to include user access up to the limits specified in the User Approved Access Table.

The session access token may include a digital signature from the server 150. A digital signature is a set of data that can be interpreted by one or more algorithms for verifying the authenticity of documents. The digital signature may be based on asymmetric cryptography that enables a creator of a message, in this case the server 150, to attach a code that acts as a signature and a private key, wherein the code is based on the message to which the signature is attached. The message can be authenticated based on a public key associated with private key. The Digital Signature Algorithm (DSA) developed by the National Institute of Standards and Technology is an example of a digital signing mechanism. In this case, the server 150 may utilize a server private key to digitally sign the session access token. Other computing devices, for example the remote device 140 or the gateway 118_GW may utilize a server public key to confirm the digital signature.

Next, in a block 208, the server 150 sends the session access token to the remote device 140. The process 200 continues in a block 210.

In the block 210, which may be omitted in some implementations, the remote device 140 may transfer the session access token to one or more other remote devices 140, for which the session access token may apply. For example, the other remote devices 140 may include one or more items of test equipment which the user may use during the access session and which may need to access vehicle systems 106 in the vehicle 105. The remote device 140 may transfer the session access token to each of the other remote devices 140 via the network 135. The process 200 continues in a block 212.

In the block 212, a remote device 140 submits the session access token to the gateway 118_GW in the vehicle 105. For example, the remote device 140 may connect to a CAN bus included in the vehicle communications network 122 and transmit the session access token to the gateway 118_GW via the CAN bus. The process 200 continues in a block 214.

In the block 214, the gateway 118_GW generates a request package for the server 150. The request package is a digital document generated by the gateway 118_GW based on the session access token received from the remote device 140 and may include:

1) the identifier for each of the vehicle systems 106 to which access is requested,
2) a challenge number respectively from one or more of the vehicle systems 106,
3) metadata for vehicle systems 106 to which access is requested, and
4) the session access token.

The gateway 118_GW, to generate the request package, may request from one or more of the vehicle systems 106 to which access is requested, a respective challenge number. The respective challenge numbers may be, for example, generated by pseudorandom number generators included in the one or more vehicle systems 106. The gateway 118_GW may include the respective challenge numbers for the one or more vehicle systems 106 in the request package.

Metadata may include serial numbers, firmware or software versions, manufacturers, part numbers, trim levels, feature content, etc. of the respective vehicle systems 106.

After assembling the request package, the gateway 118_GW may further encrypt the request package, for example by using the gateway 118_GW private key. The process 200 continues in a block 216.

In the block 216, the gateway 118_GW transmits the request package to the server 150 via the network 135. The process 200 continues in a block 218.

In the block 218, in the case that the gateway 118_GW encrypted the request package, the server 150 decrypts the request package. For example, in a case that the gateway 118_GW encrypted the request package using the gateway 118_GW private key, the server 150 decrypts the request package using the gateway 118_GW public key. The process 200 continues in a block 220.

In the block 220, the server 150 determines whether the request package is authorized. In the case that the request package was encrypted, the server 150 confirms that the decryption with the gateway 118_GW public key is successful, thereby confirming that the encryption was performed using the gateway 118_GW private key.

The server 150 may further generate challenge responses to challenge numbers from the vehicle systems 106 included in the request package. Challenge responses may be numbers (or alphanumeric strings) generated by response generator algorithms associated with respective vehicle systems 106. For example, upon receiving the challenge numbers included in the request package, the server 150 may submit the challenge numbers to response generator algorithms associated with the vehicle system 106 that generated the challenge number. In some cases, the server 150 may include, i.e., store in memory, the response generator algorithms respectively for the one or more vehicle systems 106. In other cases, one or more of the response generator algorithms may be maintained on another server, with which the server 150 may communicate via the network 135.

The server 150 may further confirm the authenticity of the user by comparing the session access token to the session access token previous signed and provided to the user. The server 150 may further reconfirm that the user is authorized, by, for example confirming that the request package is received within the time frame for the session. The server 150 may further reconfirm that the identifier of the user is included in the list of approved users. In the case that the server 150 confirms that the request package is authorized, the process 200 continues in a block 222. Otherwise, the server 150 denies the request package and the process 200 ends. The server 150 may send a message, for example to the gateway 118_GW, notifying the gateway 118_GW that the request package was denied.

In the block 222, the server 150 generates a response package. The response package is a digital document generated by the server 150 based on the request package received from the gateway 118_GW. The response package may further be based on the request for the session access token received previously from the remote device 140. The response package includes:
1) the request package,
2) session unique tokens for vehicle systems 106,
3) challenge responses, and
4) vehicle system 106 specific submission scripts.

A session unique token for a vehicle system 106 is a digital representation of rights to interact with a specified vehicle system 106 during a specified session. Vehicle system 106 specific submission scripts are sets of instructions (digital code), which may be executed, for example by the gateway 118_GW, to provide access to a specified vehicle system 106 by the remote device 140.

After generating the response package, the server 150 may then encrypt the response package using the server 150 private key. The process 200 continues in a block 224.

In the block 224, the server 150 transmits the response package to the gateway 118_GW. The process continues in a block 226.

In the block 226, the gateway 118_GW decrypts, if necessary, the response package. For example, in a case that the server 150 encrypts the response package using the server 150 private key, the gateway 118_GW may decrypt the response package using the server 150 public key.

Next, in a block 228, the gateway 118_GW authenticates the response package. Initially, the gateway 118_GW determines whether the gateway 118_GW was able to decrypt the response package, i.e., did it receive an expected result from decrypting the response package. Further, the gateway 118_GW determines whether the request package, included in the response package, matches the request package previously provided to the server 150. In a case that the gateway 118_GW authenticates the response package, i.e., was able to decrypt the response package and/or the returned request package matched the previous sent request package, the process 200 continues in a block 230. Otherwise, the process 200 ends. Prior to ending the process 200, the gateway 118_GW may notify the user (via the remote device 140) and/or the server 150 that the access request was declined.

In the block 230, the gateway 118_GW unlocks the vehicle systems 106 specified in the request package to the specified level of access for the user via the remote device 140. The gateway 118_GW executes the submission scripts to install the session unique token for each respective vehicle system 106 enabling access by the remote device 140. The gateway 118_GW may further submit challenge responses to the respective vehicle systems 106 for verification by the respective vehicle systems 106. The process 200 continues in a block 232.

In the block 232, the gateway 118_GW monitors the vehicle communications network 122. For example, the gateway 118_GW may monitor messages on a CAN bus in the vehicle communications network 122 on which the remote device 140 is communicating, i.e., sending messages. The process 200 continues in a block 234.

In the block 234, the gateway 118_GW determines whether a session ending event has occurred. A session ending event is a message, electrical signal, a change in a system voltage level, etc. indicating that the session has ended or is about to end. For example, a session ending event may be a message from the remote device 140 that the user is logging out. As another example, a message on the vehicle communications network 122 may indicate that the time of day is 19:00, and the session is scheduled, by the session access token, to end at 19:00. As another example, an electrical signal or a change in a voltage level of supply voltage, may indicate that the vehicle 105 has been turned off, or that power has been removed from the vehicle 105. The examples listed above are not limiting. Other messages, signals, changes in voltage levels, etc. may also indicate that the session has ended. In case that the gateway 118_GW determines that the session ending event has occurred, the process 200 ends. Otherwise, the process 200 continues in the block 232.

In the description above of the example process 200, requests for session access for a vehicle 105 are described as received, processed and distributed by a gateway 118_GW in the vehicle 105. This is only an example and not intended to be limiting. The operations ascribed to the gateway 118_GW may be performed in whole or in part by one or more other vehicle systems 106 such as, for example, another component 118.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

As used herein, the term "based on" means based on in whole or in part.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a vehicle gateway computer including a first processor and a first memory, the first memory including instructions such that the first processor is programmed to:
   receive, from a remote device, a session access token that specifies access to a vehicle and includes a digital signature from a server and specifies access to one or more vehicle systems for the remote device;
   send, to a server, a first digital document including the session access token that specifies access to one or more vehicle systems for the remote device;
   receive, from the server, a second digital document that is based on the first digital document including the session access token previously received from the remote device and that authorizes the specified access to the one or more vehicle systems; and
   provide, to the remote device, the specified access to the one or more vehicle systems based on receiving an expected result from decrypting the second digital document.

2. The system of claim 1, wherein the second digital document includes one or more third digital documents, the one or more third digital documents authorizing the specified access to vehicle systems of the one or more vehicle systems.

3. The system of claim 2, wherein the first processor is further programmed to:
   install each of the one or more third digital documents in a respective vehicle system for which the respective third digital document authorizes the specified access.

4. The system of claim 3, wherein the second digital document includes a script to install at least one of the one or more third digital documents in the respective vehicle system; and the first processor is further programmed to:
   execute the script.

5. The system of claim 1, wherein the specified access to the one or more vehicle systems is based on a user identifier.

6. The system of claim 1, wherein the second digital document is encrypted based on a server private key; and the first processor is further programmed to:
decrypt the second digital document based on a server public key.

7. The system of claim 1, wherein the first processor is further programmed to:
transmit a request to the server prior to receiving the second digital document from the server, the request including identifiers for the one or more vehicle systems and data from the first digital document.

8. The system of claim 7, wherein the first processor is further programmed to:
authenticate the second digital document based in part on the second digital document including data from the request to the server.

9. The system of claim 1, further comprising the server including a second processor and a second memory, the second memory including instructions such that the second processor is programmed to:
receive a message from the remote device, requesting access to the one or more vehicle systems;
generate the first digital document specifying the access to the one or more vehicle systems for the remote device and including the digital signature from the server; and
transmit the first digital document to the remote device.

10. The system of claim 9, wherein the second processor is further programmed to:
specify the access to the one or more vehicle systems based on at least one of a user identifier and a remote device identifier included in the message.

11. The system of claim 9, wherein the second processor is further programmed to:
generate the first digital document based on determining that a user identifier in the message is included in a list of authorized user identifiers.

12. The system of claim 9, wherein the second processor is further programmed to:
generate the first digital document based on determining that a remote device identifier in the message is included in a list of authorized remote devices.

13. The system of claim 9, wherein the second processor is further programmed to:
upon receiving the message from the first processor, confirm that the message includes the first digital document; and
based on the confirmation, generate the second digital document.

14. The system of claim 9, wherein the second processor is further programmed to:
generate a challenge response to a challenge number from one of the one or more vehicle systems in the message; and
include the challenge response in the second digital document.

15. A method comprising:
receiving, from a remote device, a session access token that specifies access to a vehicle and includes a digital signature from a server and specifies access to one or more vehicle systems for the remote device;
sending, to a server, a first digital document including the session access token that specifies access to one or more vehicle systems for the remote device;
receiving, from the server, a second digital document that is based on the first digital document including the session access token previously received from the remote device and that authorizes the specified access to the one or more vehicle systems; and
providing, to the remote device, the specified access to the one or more vehicle systems based on receiving an expected result from decrypting the second digital document.

16. The method of claim 15, wherein the second digital document includes one or more third digital documents, the one or more third digital documents authorizing the specified access to vehicle systems of the one or more vehicle systems.

17. The method of claim 16, further comprising:
installing each of the one or more third digital documents in a respective vehicle system for which the respective third digital document authorizes the specified access.

18. The method of claim 17, wherein the second digital document includes a script to install at least one of the one or more third digital documents in the respective vehicle system, further comprising:
executing the script.

19. The method of claim 15, wherein the specified access to the one or more vehicle systems is based on a user identifier.

20. The method of claim 15, wherein the second digital document is encrypted based on a server private key, further comprising:
decrypting the second digital document based on a server public key.

* * * * *